US011050832B2

(12) United States Patent
Figueroa et al.

(10) Patent No.: US 11,050,832 B2
(45) Date of Patent: Jun. 29, 2021

(54) MAINTAINING A SESSION ACROSS MULTIPLE WEB APPLICATIONS

(71) Applicant: Citrix Systems, Inc., Fort Lauderdale, FL (US)

(72) Inventors: Javier Alejandro Figueroa, Miramar, FL (US); Gerald Duane Haagsma, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 264 days.

(21) Appl. No.: 15/472,872

(22) Filed: Mar. 29, 2017

(65) Prior Publication Data

US 2018/0288162 A1 Oct. 4, 2018

(51) Int. Cl.
*H04L 29/08* (2006.01)
*H04L 29/06* (2006.01)

(52) U.S. Cl.
CPC ........ *H04L 67/141* (2013.01); *H04L 63/0838* (2013.01); *H04L 67/025* (2013.01); *H04L 67/146* (2013.01)

(58) Field of Classification Search
CPC .................................................. H04L 67/141
See application file for complete search history.

(56) References Cited

U.S. PATENT DOCUMENTS

| 7,188,181 B1* | 3/2007 | Squier ............... G06F 21/41 |
| | | 709/228 |
| 8,213,423 B1* | 7/2012 | Breau ............... H04L 12/1403 |
| | | 370/389 |
| 8,528,065 B2 | 9/2013 | Ramos Robles et al. |
| 8,613,070 B1 | 12/2013 | Borzycki et al. |
| 8,763,102 B2 | 6/2014 | Furman et al. |
| 9,355,223 B2 | 5/2016 | Qureshi |
| 2003/0105981 A1 | 6/2003 | Miller et al. |

(Continued)

FOREIGN PATENT DOCUMENTS

WO 046880 3/2014

OTHER PUBLICATIONS

International Search Report and the Written Opinion from International Searching Authority (US) for International Application No. PCT/US2018/024561, dated Jun. 25, 2018, 16 pages.

(Continued)

*Primary Examiner* — Andrew C Georgandellis
(74) *Attorney, Agent, or Firm* — BainwoodHuang

(57) ABSTRACT

A technique for maintaining user sessions across multiple web applications includes receiving, by a first web application running on a first server, a cross-application request from a client application. The cross-application request indicates a user action to access a second web application, which runs on a second server. In response to receiving the cross-application request, the first web application sends a single-use password to the client application, which may send the single-use password to the second web application. The first web application receives a session request, which includes the single-use password, from the second web application. In response to receiving the session request, the first web application sends session data to the second web application, enabling the second web application to participate in a session with the client application.

18 Claims, 4 Drawing Sheets

(56) References Cited

U.S. PATENT DOCUMENTS

| | | | |
|---|---|---|---|
| 2005/0120223 A1* | 6/2005 | Kiwimagi | G06F 21/33 |
| | | | 713/182 |
| 2009/0199276 A1 | 8/2009 | Schneider | |
| 2010/0031317 A1* | 2/2010 | Mason | H04L 63/0281 |
| | | | 726/3 |
| 2013/0139218 A1* | 5/2013 | Roulland | G06F 21/42 |
| | | | 726/3 |
| 2014/0032733 A1 | 1/2014 | Barton et al. | |
| 2017/0149873 A1* | 5/2017 | Jang | H04N 21/4402 |

OTHER PUBLICATIONS

Italo Dacosta et al.; "One-time cookies: Preventing session hijacking attacks with stateless authentication tokens", ACM Transactions on Internet Technology, vol. 12, No. 1, Jun. 1, 2012, pp. 1-24.
Italo Dacosta et al.; "One-time cookies: Preventing session hijacking attacks with disposable credentials", pp. 1-18.

* cited by examiner

MAINTAINING A SESSION ACROSS MULTIPLE WEB APPLICATIONS

BACKGROUND

Web applications commonly employ cookies for holding session information. The cookies provide a mechanism for a browser to store such information as a user navigates from one page to another within a particular site. For example, session cookies enables the browser to confirm that a session is still active and that the user has been successfully authenticated. Cookies are generally specific to particular web domains. For example, a cookie deposited by the domain "uspto.gov" could be used for activity within that domain but would not be useable for activity within the domain "patentfetcher.com."

Sometimes, multiple web applications form a suite of related applications. If the related applications are hosted from different domains, the applications may include hidden web elements that render web content from one or more other applications. For example, Application A in Domain A may serve a webpage that includes an HTML (Hyper Text Markup Language) iframe element (inline frame). The iframe, which appears within a webpage downloaded from Application A, renders content downloaded from Application B, which is hosted in Domain B. The iframe's content allows the browser to access a cookie from Domain B (e.g., using JavaScript or some other client-side script) and thus to access session information relating to the browser's session with Application B. Thus, for example, if a user has already authenticated to Application B and the browser has stored a session cookie from Domain B, a downloaded webpage from Application A can use Domain B's session cookie by virtue of the iframe element, thus avoiding any need to authenticate the same user to Application A. In this manner, the user can seamlessly move from one web application in the suite to another without having to reauthenticate, even though the web applications are hosted from different domains.

SUMMARY

Unfortunately, browsers can sometimes disable cookies or manage them in different ways, which may lead to a loss of functionality in systems that rely on cookies. Also, using cookies to store user session information can sometimes expose the session information to eavesdroppers, who may use the session information to gain access to protected resources.

In contrast with prior schemes, certain embodiments are directed to a method of maintaining user sessions across multiple web applications. The method includes receiving, by a first web application running on a first server, a cross-application request from a client application running on a client device. The cross-application request indicates a user action to access a second web application, which runs on a second server. The method further includes sending, by the first web application in response to receiving the cross-application request, a single-use password to the client application, which may send the single-use password to the second web application. The method further includes receiving, by the first web application, a session request from the second web application. The session request includes the single-use password as received by the second web application from the client application. In response to receiving the session request, the method still further includes sending, by the first web application, session data to the second web application. The session data (i) pertains to a session previously established between the client application and the first web application and (ii) enables the second web application to participate in the session with the client application.

Other embodiments are directed to a computerized apparatus constructed and arranged to perform a method of maintaining user sessions across multiple web applications, such as the method described above. Still other embodiments are directed to a computer program product. The computer program product stores instructions which, when executed by control circuitry, cause the control circuitry to perform a method of maintaining user sessions across multiple web applications, such as the method described above.

The foregoing summary is presented for illustrative purposes to assist the reader in readily grasping example features presented herein; however, this summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. Such embodiments are provided by way of example to illustrate certain features and principles of the invention but that the invention hereof is not limited to the particular embodiments described.

An improved technique for maintaining a session across multiple web applications includes generating a single-use password by a first web application engaged in a session with a client application, passing the single-use password to the client application, and providing session data in response to a session request from a second web application, the second web application having received the single-use password from the client application. After validating the single-use password, the technique further includes the first web application providing the session data to the second web application, thus enabling the second web application to participate in the session previously established between the first web application and the client application. Advantageously, the need for cookies to maintain session information across web applications is avoided, as are the security risks and functional obstacles that the use of cookies entails.

Figure 1:
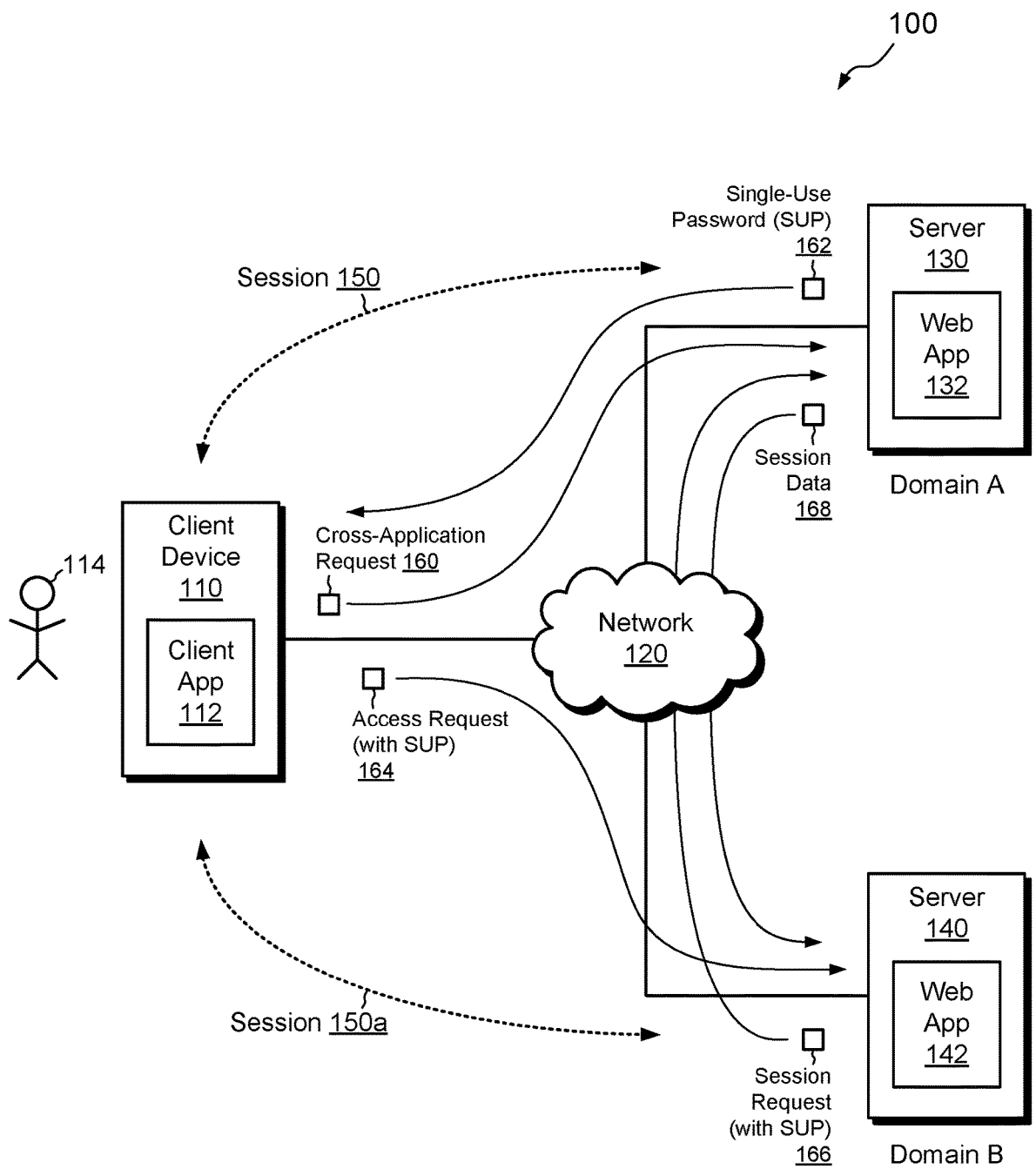
FIG. 1 is a block diagram showing an example environment in which example embodiments of the invention can be performed.

FIG. 1 shows an example environment 100 in which embodiments of the improved technique hereof can be practiced. Here, a client device 110 runs a client application 112, which is operable by a user 114. The client application 112 is configured to access, over a network 120, a first web application 132 on a first server 130 and a second web application 142 on a second server 140.

The client device 110 may be any computing device capable of running the client application 112 and communicating over the network 120. Suitable examples of the client device 110 include a desktop computer, laptop computer, workstation, smart phone, smart tablet, personal data assistant (PDA), set top box, or game console, for example. The servers 130 and 140 may be implemented using any computing machines capable of running the web applications 132 and 142. In a particular example, the servers 130 and 140 are implemented using server-grade computers and/or virtual machines running on such server-grade computers. The network 120 is preferably the Internet, but may also be a local area network (LAN), wide area network (WAN), a cellular data network, or any network or combination of networks.

In example operation, the user 114 operates the client application 112 on the device 110. The client application 112 participates in a session 150 with the first web application 132. For example, the client application 112 is a web browser that renders web pages downloaded from the first web application 132. Alternatively, the client application 112 may be any web-enabled application or app, which interacts with web application 132 and exchanges data therewith. The first server 130 stores session data 168 pertaining to the session 150. Such session data 168 may include, for example, a user ID (identifier) of the user 114, privileges of the user 114 to perform various activities, a token for accessing restricted information, and a session timeout interval. In an example, the server 130 binds together such session data 168 in a session data object, which is maintained as an addressable element in volatile or non-volatile storage within the server 130.

At some point during the session 150, the user 114 operates a control, e.g., a link rendered on a downloaded webpage from the first user application 132, to issue a cross-application request 160, e.g., in an attempt to access the second web application 142 on the second server 140. The first web application 132 receives the cross-application request 160 and provides, in response thereto, a single-use password (SUP) 162. Preferably, the SUP 162 has a short expiration time, e.g., measured in seconds, after which the SUP 162 becomes invalid and cannot be used. The client application 112 receives the SUP 162 and forwards the SUP 162 in an access request 164 to the second web application 142. After receiving the SUP 162 in the access request 164, the second web application 142 forms a session request 166, which the second web application 142 sends to the first web application 132 with the SUP 162. The first web application 132 receives the session request 166, tests the SUP 162 against the value it sent to the client application 112, and, assuming that the SUP 162 checks out as valid and that any other security requirements are met, replies to the session request 166 with a response that includes the session data 168. The second web application 142 then uses the session data 168 to engage with the client application 112 in a session 150*a*, which is a continuation of the session 150. Thus, the web application 142 uses the session data 168 as its current session data with the client application 112, such that there is no need to reauthenticate the user 114 or to establish a new session. Rather, the second web application 114 uses the results of the prior authentication, e.g., performed when the user 114 logged on to the first web application 132.

In the event that the second web application 142 requires stronger authentication than does the first web application 132, the second web application 142 may perform additional authentication tasks, but there would be no need to repeat the ones already performed by the first web application 132.

In the manner described, session information is maintained even as the user's activities shift from interactions with the first web application 132 to interactions with the second web application 142. In some examples, the session 150 between the client application 112 and the first server application 132 continues even after the session 150*a* begins, such that the first server application 132 can still respond to requests from the client application 112 without having to start a new session or to reauthenticate. In other examples, the session 150 terminates upon commencement of the session 150*a*; however, restoration of the session 150 can proceed using the same approach as described above, only with the roles of the first and second web applications reversed.

Also, the same session 150/150*a* may be extended to a third web application (not shown), or to any number of additional web applications, e.g., in response to the user 114 initiating cross-application requests to access those web applications from pages rendered by the client application 112. In an example, session activity by any web application participating in the session with the client application 112 can reset the session timeout, such that the session may continue indefinitely as long as the user 114 remains active.

Figure 2:
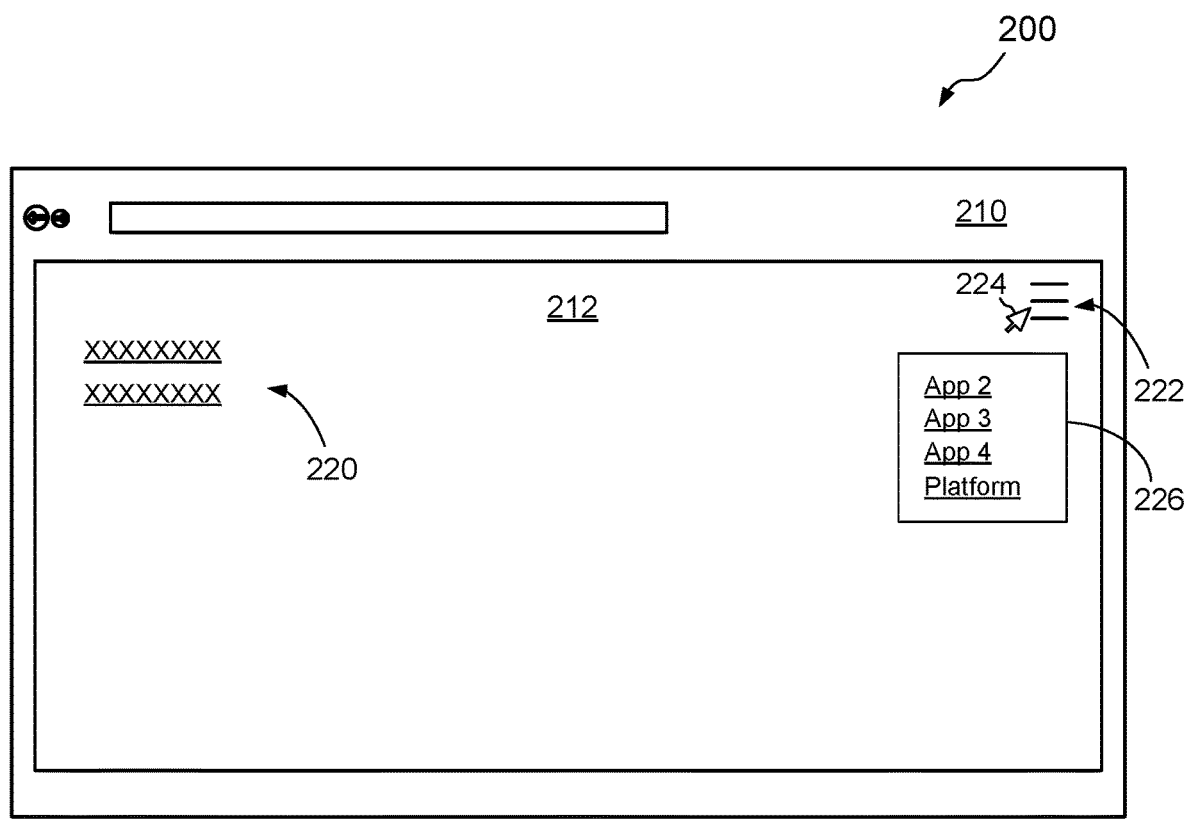
FIG. 2 is a simplified screenshot showing a web page that includes a user control for initiating a cross-application request in the environment of FIG. 1.

FIG. 2 shows an example screenshot 200 of the client application 112, which in this case is a web browser. As shown, the client device 110 displays the web browser in an application window 210, which includes a content window 212 showing a webpage downloaded from the first web application 132. The webpage includes controls 220 and 222, which enable the user 114 to interact with the first web application 132 within the session 150 (FIG. 1).

At some point during the session 150, the user 114 may operate a cursor 224 to select the control 222 (e.g., a hamburger icon). Upon selecting the control 222, the browser displays a list 226 of other web applications that are available from the current page. These include, in the current example, the second web application 142 ("App 2"), a third web application ("App 3"), a fourth web application ("App 4"), and a "Platform" application, e.g., an application that unifies the other applications in a common framework. The user 114 may use the cursor 224 to select one of the listed items, with the effect of the selection being to initiate a cross-application request. For instance, and continuing with the example of FIG. 1, the user 114 may select "App 2" to initiate the cross-application request 160.

In an example, the user's selection of "App 2" from the list 226 initiates a script (e.g., a JavaScript event procedure) to send the cross-application request 160 to the first web application 132 and to wait for a response that contains the SUP 162. When the response is received, the script may continue operation by issuing the access request 164, which provides the SUP 162 to the second web application 142, i.e., to the web application that corresponds to the user's selection from the list 226. Other activities proceed as described in connection with FIG. 1 above.

Figure 3:
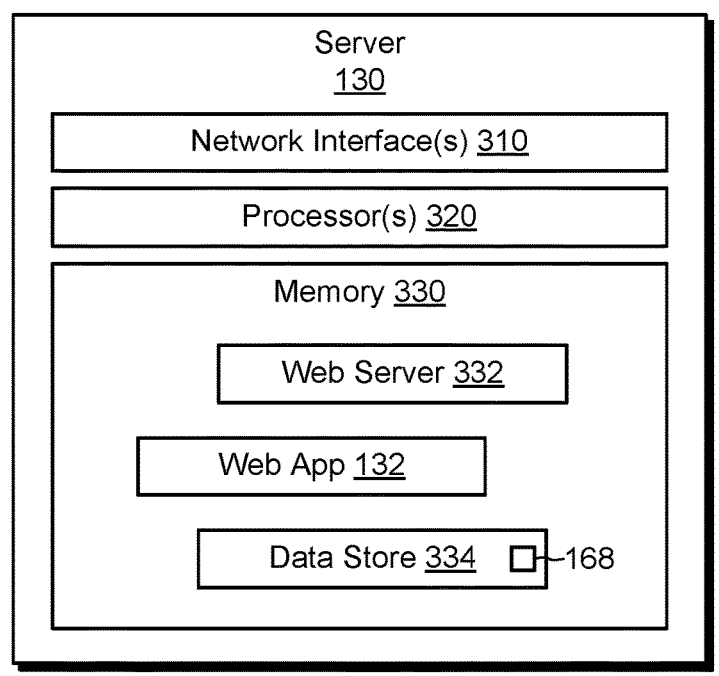
FIG. 3 is a block diagram of an example server of FIG. 1.

FIG. 3 shows an example of the first server 130 in additional detail. One should appreciate that the illustrated example also applies to the second server 140. Here, the server 130 includes one or more network interfaces 310, a set of processors 320, and memory 330. The set of processors 320 include one or more processing chips and/or assemblies. The memory 330 includes both volatile memory, such as RAM (Random Access Memory), and non-volatile memory, such as one or more ROMs (Read-Only Memories), disk drives, solid state drives, and the like. The set of processors 320 and the memory 330 together form control circuitry, which is constructed and arranged to carry out various server-based methods and functions as described herein. Also, the memory 330 includes a variety of software constructs realized in the form of executable instructions. When the executable instructions are run by the set of processors 320, the set of processors 320 are caused to carry out the operations of the software constructs. Although certain software constructs are specifically shown and described, it is understood that the memory 330 typically includes many other software constructs, which are not shown, such as an operating system, various applications, processes, and daemons.

The memory 330 is seen to "include," i.e., realize by execution of software instructions, a web server 332, a data store 334, and the above-described web application 132. The web server 332 uses HTTP (HyperText Transfer Protocol) to receive requests from clients (e.g., browsers or web-enabled applications or apps) and to respond to client requests by serving web pages and/or other content. The web application 132 provides the web pages and/or other content and performs back-end processing to support required functionality. The data store 334 provides data storage services for use by the web application 132. In some examples, the data store 334 includes an in-memory data structure store, such as Redis (open source), which may transiently store session data, including session data 168, e.g., until the sessions expire. The data store 334 may also include persistent storage structures, such as one or more relational databases, noSQL databases, and the like. Although the server 130 is shown as a single computing machine, it may alternatively be implemented using multiple machines that operate in a coordinated fashion. Further, portions of the server 130 may be implemented using one or more virtual machines.

Figure 4:
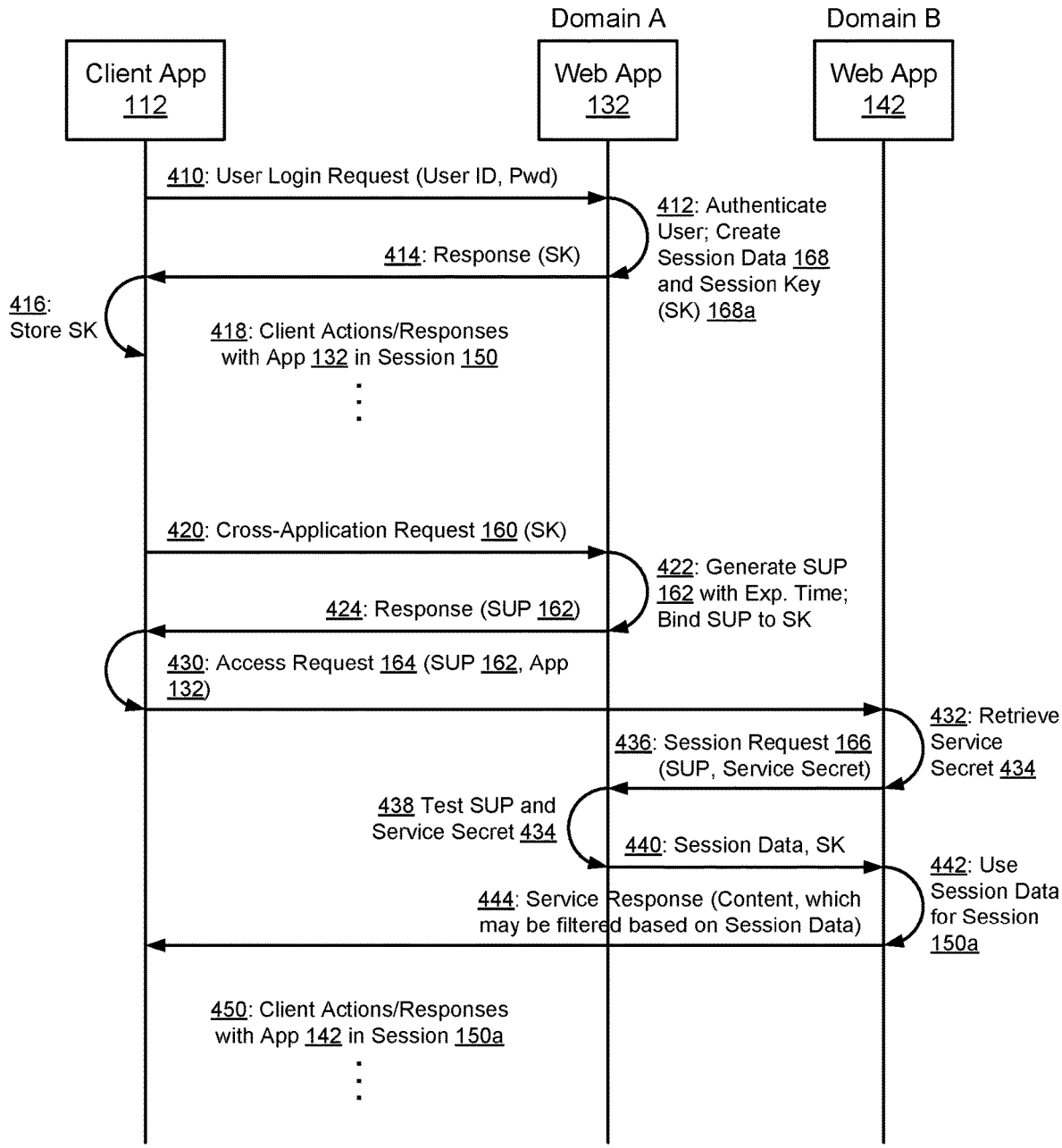
FIG. 4 is a sequence diagram showing an example sequence of events among certain elements of FIG. 1 for maintaining a session across multiple web applications.

FIG. 4 shows an example sequence of activities for maintaining a session across multiple web applications. The illustrated activities involve the client application 112, the first web application 132, and the second web application 142. The sequence as shown is based on the same example as that described in connection with FIG. 1.

The illustrated operations begin at 410, where the client application 112 submits a login request to the first web application 132. For example, the client application 112 may have previously downloaded a login page from the web server 332. The login request issued by the client machine 112 may provide a user ID (e.g., of the user 114), a password, biometric information, and/or any other information required to authenticate the user 114.

At 412, the first web application 132 receives the login request and proceeds to authenticate the user 114. Assuming that authentication succeeds, meaning that the identity of the user 114 is verified, the first web application 132 creates session data 168 for session 150 (see also FIG. 1). The session data 168 may include, for example, the user ID, privileges of the user to perform various activities, a token for use in accessing restricted information and/or functionality, and a session timeout interval. The session timeout interval defines an interval of time that the session 150 remains open when the user 114 is inactive. Example session timeout intervals are 20 minutes, one hour, etc., and may be reset to starting values as long as the user 114 remains active.

At this time, the first web application 132 may also create a session key (SK) 168a, e.g., a random or pseudo-random number that uniquely identifies the session data 168. In a particular example, the first web application 132 stores the session data 168 in the Redis data store (part of 334) at a location defined by the session key 168a.

At 414, the first web application 132 sends the session key 168a back to the client application 112, e.g., in response to the login request issued at 410. At 416, the client application 112 stores the session key 168a in the client device 110, such as in local memory, in cache, in a transient cookie, or on disk.

Activities 410-416 establish session 150. As shown generally by operations 418, session 150 may proceed over time, with the client application 112 performing various actions and the first web application 132 providing responses in the usual manner, within the context of the session 150.

At some point during the session 150, the user 114 may operate a user control in an attempt to access data or functionality provided by a different web application, such as the second web application 142. For example, the user 114 operates the hamburger icon 222 (FIG. 2) and selects "App2" from the displayed list 226.

At 420, in response to the user operation, the client application 112 sends a cross-application request 160 to the first web application 132. In an example, the cross-application request 160 includes the session key 168a, i.e., the same session key that the client application 112 received and stored at 416. One should appreciate that the cross-application request 160 is directed to the first web application 132, where the session 150 is currently active, rather than to the second web application 142, where the desired data or functionality that the user selected is actually provided.

At 422, the first web application 132, having received the cross-application request 160, responds by generating or otherwise providing a single-use password (SUP) 162. In an example, the SUP 162 is a crypto-random code having a short lifetime, such as ninety seconds or less, after which it becomes invalid. The first web application 132 may then bind the SUP 162 to the session key 168a for the session 150. For example, the first web application 132 may create a new data object that associates the SUP with the session key 168a.

At 424, the first web application 132 provides the SUP 162 in a response to the cross-application request 160. The client application 112 receives the SUP 162 and proceeds to generate an access request 164.

At 430, the client application 112 sends the access request 164 to the second web application 142. For example, and as described in connection with FIG. 2, the client application 112 runs a script that detects the user's selection of "App2" from the list 226, sends the cross-application request 160 (420) and waits for receipt of the SUP 162. The client application 112 (e.g., acting via the script) responds to receipt of the SUP 162 by sending the access request 164 to the second web application 142 (430). The access request 164 includes the SUP 162 and may also identify the first web application 132 as the current session participant.

At 432, upon receiving the access request 164, the second web application 142 retrieves a service secret 434. The service secret 434 is a value previously assigned to the second web application 142, e.g., by the above-described platform server before the events depicted here, and identifies the second web application 142 as a trusted part of the platform.

At 436, the second web application 142 sends a session request 166 to the first web application 132. The session request 166 includes the SUP 162 and the service secret 434.

At 438, the first web application 132 receives the session request 166 and proceeds to test the session request 166 for authenticity. For example, the first web application 132 checks whether the SUP as received in the session request 166 matches the SUP 162 that it created (at 422). The first web application 132 may also test whether the service secret 434 matches an expected value.

At 440, assuming the testing at 438 produces a valid result, the first web application 132 responds to the session request 166 by providing the session data 168 and the session key 168a. For example, the first web application 132 accesses the data object that binds the SUP to the session key 168a (from 422), and accesses the session data 168 using the session key 168a. In an example, the first web application 132 destroys or otherwise invalidates the SUP 162 once it sends the response to the session request at 440, even if the SUP 162 has not yet expired, to ensure that the SUP 162 is used only once.

At 442, the second web application 142 receives the session data 168 and session key 168a from the first web application 132 and proceeds to use the session data 168 and session key 168a for maintaining the session 150a with the client application 112. For example, the second web application 142 has access to its own in-memory data store, such as Redis, and stores session data 168 in the data store under the session key 168a, e.g., in the same manner as described at 422 above by the first web application 132.

At 444, the second web application 142 may issue a service response, which may include content that the user requested when initiating the cross-application request 160. For example, the content may include a web page served by the second web application 142. In some examples, the content served to the client application 112 is limited based on authorization information contained in the session data 168. For example, the second web application 142 may filter out data or functionality that the session data 168 indicates the user 114 is not authorized to access.

At 450, the session 150a proceeds between the client application 112 and the second web application 142. For example, the client application 112 issues requests to the second web application 142, and the second web application 142 provides responses to the client application 112. The second web application 142 may reset the session timeout, if necessary. Also, later-received cross-application requests from the client application 112 may initiate an analogous sequence of events as described at 420, 422, 430, 432, 436, 438, 440, 442, and 444, for maintaining the session with some other web application or again with the first web application 132.

Figure 5:
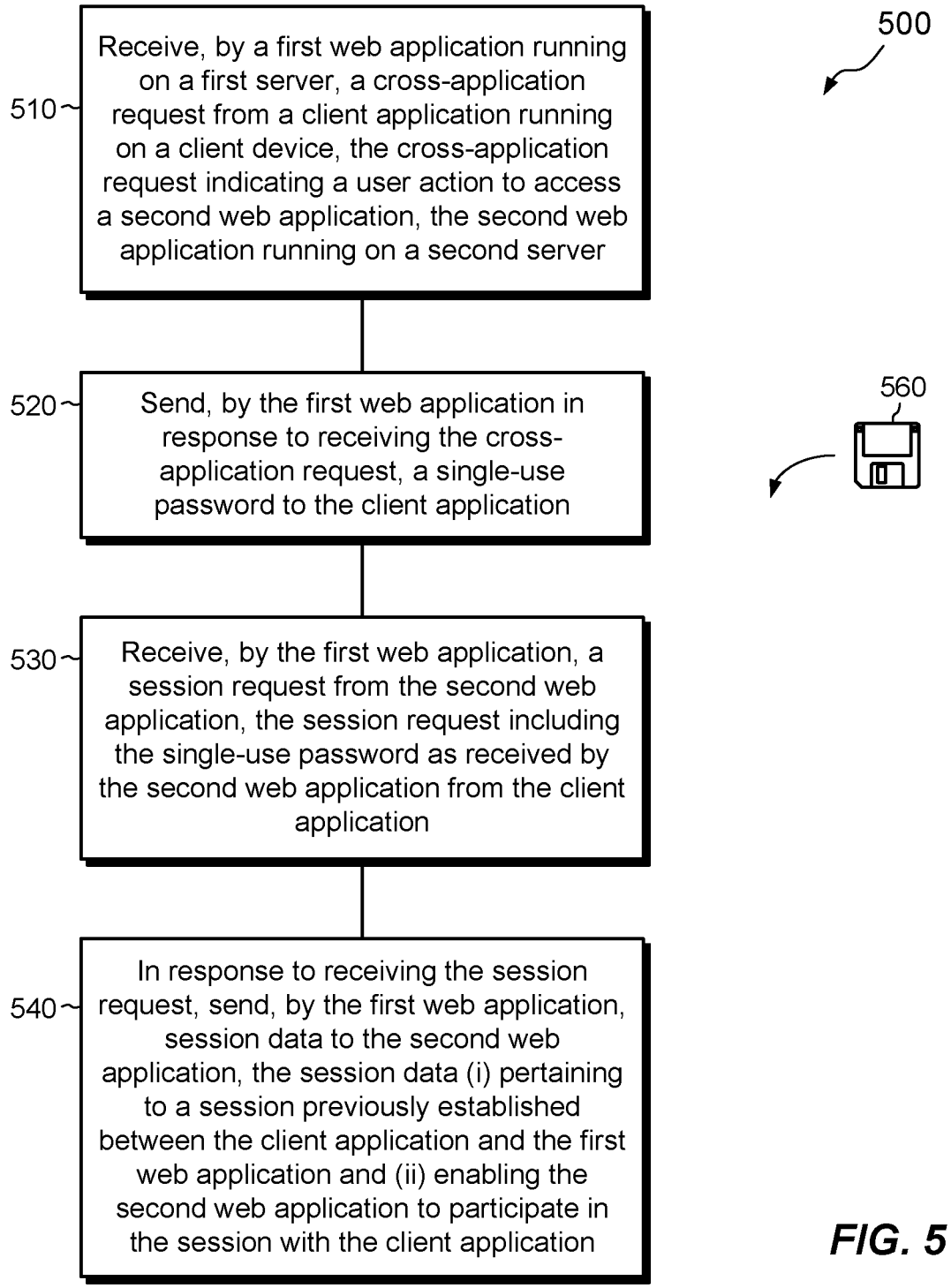
FIG. 5 is a flowchart showing an example method of maintaining a session across multiple web applications.

FIG. 5 shows an example method 500 that may be carried out in connection with the environment 100. The method 500 is typically performed, for example, by the software constructs described in connection with FIG. 3, which reside in the memory 330 of the first server 130 and are run by the set of processors 320. The various acts of the method 500 may be ordered in any suitable way. Accordingly, embodiments may be constructed in which acts are performed in orders different from that illustrated, which may include performing some acts simultaneously.

At 510, a first web application 132, running on a first server 130, receives a cross-application request 160 from a client application 112 running on a client device 110. The cross-application request 160 indicates a user action to access a second web application 142, which runs on a second server 140. For example, the client application 112 is a web browser or web-enabled application or app, which sends the cross-application request 160 in response to the user 114 operating a control. In an example, the user 114 has already been authenticated by this point, and a session 150 has been established between the client application 112 and the first web application 132.

At 520, the first web application 132 sends a single-use password 162 to the client application 112 in response to receiving the cross-application request 160. For example, the first web application generates the SUP 162 in response to receiving the cross-application request 160. The SUP 162 has a short lifetime, after which it becomes invalid.

At 530, the first web application 132 receives a session request 166 from the second web application 142. The session request 166 includes the single-use password 162 as received by the second web application 142 from the client application 112. For example, the client application 112, upon receiving the SUP 162 from the first web application 132, sends an access request 164 to the second web application 142. The access request 164 provides the SUP 162 and identifies the first web application 132 as the application engaged in the current session 150. The second web application 142 receives the access request 164 and responds by providing the session request 166.

At 540, the first web application 132 sends session data 168 to the second web application 142 in response to receiving the session request 166. The session data 168 (i) pertains to the session 150 previously established between the client application 112 and the first web application 132 and (ii) enables the second web application 142 to participate in the session 150 with the client application 112, e.g., as the session 150a.

An improved technique has been described for maintaining a session across multiple web applications. The technique employs a single-use password 162 for passing session data 168 from a first web application 132 to a second web application 142. The technique maintains a session across multiple web applications without requiring cookies, which are not always enabled or managed the same way by different client software. The technique also enhances security by avoiding transmission of sensitive information in cookies over the Internet.

Having described certain embodiments, numerous alternative embodiments or variations can be made. For example, some embodiments may employ a separate platform server that acts to coordinate operations between and among the various web applications and to unify such web applications under a common framework. The platform server may perform various functions in the environment 100, such as maintaining user accounts, maintaining lists of trusted web applications that are part of the platform, and issuing service secrets 434 (FIG. 4).

Although web applications 132 and 142 may be part of a common framework, this is not required. For example, embodiments may be constructed in which web applications are unrelated except for the fact that they support the functionality described. For example, otherwise unrelated applications may run software that supports cross-application requests, generates signal-use passwords, create and send session requests 166, and provides session data 168 in response to session requests 166 from other applications. Thus, any web application can employ the techniques described herein provided that they are provided with software features that support the described functionality.

Further, although the techniques disclosed herein may be used in place of cookies for maintaining sessions across web applications, such techniques do not preclude the use of cookies for other purposes.

Also, although techniques have been described for maintaining sessions across web applications hosted from different domains, such techniques may also be used for web applications within a single domain. The techniques described herein may thus be regarded as domain-agnostic, without any requirement that web applications be in different domains.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 560 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of maintaining user sessions across multiple web applications, the method comprising:
   receiving, by a first web application running on a first server, a cross-application request from a client application running on a client device, the cross-application request indicating a user action to access a second web application, the second web application running on a second server;
   sending, by the first web application in response to receiving the cross-application request, a single-use password to the client application;
   receiving, by the first web application, a session request from the second web application via a web server running on the second server, the session request including the single-use password as received by the second web application from the client application via the web server; and
   in response to receiving the session request, sending, by the first web application, session data to the second web application, the session data (i) pertaining to a session previously established between the client application and the first web application and (ii) enabling the second web application to participate in the session with the client application,
   wherein the method further comprises the first server generating the single-use password in response to the first web application receiving the cross-application request, the first server generating the single-use password with a predefined expiration period, wherein the first web application is configured to treat the single-use password as invalid after the expiration period has elapsed, and wherein the session data as sent to the second web application includes a list of allowed operations that the user is permitted to perform, such that the second web application restricts activities of the user to those included in the list of allowed operations.

2. The method of claim 1, further comprising, prior to the first server receiving the cross-application request:
   creating the session data upon establishing the session with the client application and after successfully authenticating a user of the client application;
   assigning a session key to the session data, the session key uniquely identifying the session data for the session from among other session data for other sessions; and
   sending the session key to the client application.

3. The method of claim 1, further comprising, after establishing the session with the client application and prior to receiving the cross-application request, sending a web page to the client device to be rendered by the client application, the web page including a user control configured to issue the cross-application request when operated by the user.

4. The method of claim 2, wherein the session key is a random or pseudorandom value.

5. The method of claim 2, wherein the cross-application request received from the client device includes the session key as previously sent to the client application.

6. The method of claim 5, further comprising, after establishing the session with the client application and prior to receiving the cross-application request, sending a web page to the client device to be rendered by the client application, the web page including a user control configured to issue the cross-application request when operated by the user.

7. The method of claim 5, wherein the session request received from the second web application further includes a service secret that identifies the second web application as trusted, and wherein sending the session data to the second web application is performed only after the first web application confirms that the service secret as received from the second web application is valid.

8. The method of claim 7, further comprising, when sending the session data to the second web application, also sending the session key to the second web application.

9. A method of maintaining user sessions across multiple web applications, the method comprising:
receiving, by a first web application running on a first server, a cross-application request from a client application running on a client device, the cross-application request indicating a user action to access a second web application, the second web application running on a second server;
sending, by the first web application in response to receiving the cross-application request, a single-use password to the client application;
receiving, by the second web application via a web server running on the second server, an access request from the client application, the access request including the single-use password;
sending, by the second web application via the web server, a session request to the first web application, the session request including the single-use password as received by the second web application in the access request; and
in response to receiving the session request, sending, by the first web application, session data to the second web application, the session data pertaining to a session previously established between the client application and the first web application, the second web application then participating in the session with the client application,
wherein the method further comprises the first server generating the single-use password in response to the first web application receiving the cross-application request, the first server generating the single-use password with a predefined expiration period, wherein the first web application is configured to treat the single-use password as invalid after the expiration period has elapsed, and wherein the session data as sent to the second web application includes a list of allowed operations that the user is permitted to perform, such that the second web application restricts activities of the user to those included in the list of allowed operations.

10. The method of claim 9, wherein the first web application and the second web application are hosted from different Internet domains.

11. The method of claim 10, wherein participating in the session with the client application includes the second web application sending content to the client application within the session.

12. The method of claim 11, further comprising the first web application successfully authenticating a user of the client application and providing an indication of successful authentication of the user in the session data,
wherein sending the content to the client application is performed based on the successful authentication of the user by the first web application and without requiring additional authentication of the user by the second web application.

13. A computer program product including a set of non-transitory, computer-readable media having instructions which, when executed by control circuitry of a first server, cause the control circuitry to perform a method for maintaining user sessions across multiple web applications, the method comprising:
receiving, by a first web application running on the first server, a cross-application request from a client application running on a client device, the cross-application request indicating a user action to access a second web application, the second web application running on a second server;
sending, by the first web application in response to receiving the cross-application request, a single-use password to the client application;
receiving, by the first web application, a session request from the second web application via a web server running on the second server, the session request including the single-use password as received by the second web application from the client application via the web server; and
in response to receiving the session request, sending, by the first web application, session data to the second web application, the session data (i) pertaining to a session previously established between the client application and the first web application and (ii) enabling the second web application to participate in the session with the client application,
wherein the method further comprises the first server generating the single-use password in response to the first web application receiving the cross-application request, the first server generating the single-use password with a predefined expiration period, wherein the first web application is configured to treat the single-use password as invalid after the expiration period has elapsed, and wherein the session data as sent to the second web application includes a list of allowed operations that the user is permitted to perform, such that the second web application restricts activities of the user to those included in the list of allowed operations.

14. The computer program product of claim 13, wherein the method further comprises, prior to the first server receiving the cross-application request:
creating the session data upon establishing the session with the client application and after successfully authenticating a user of the client application;
assigning a session key to the session data, the session key uniquely identifying the session data for the session from among other session data for other sessions; and
sending the session key to the client application.

15. The computer program product of claim 14, wherein the cross-application request received from the client device includes the session key as previously sent to the client application.

16. The computer program product of claim 15, wherein the method further comprises, after establishing the session with the client application and prior to receiving the cross-application request, sending a web page to the client device to be rendered by the client application, the web page including a user control configured to issue the cross-application request when operated by the user.

17. The computer program product of claim 15, wherein the session request received from the second web application further includes a service secret that identifies the second web application as trusted, and wherein sending the session data to the second web application is performed only after the first web application confirms that the service secret as received from the second web application is valid.

18. The computer program product of claim 17, wherein the method further comprises, when sending the session data to the second web application, also sending the session key to the second web application.

* * * * *